United States Patent
Mieth

[11] Patent Number: 5,575,305
[45] Date of Patent: Nov. 19, 1996

[54] PROCEDURE FOR CLEANING A DOUBLE SEAT VALVE AND VALVE ARRANGEMENT FOR IMPLEMENTING THE PROCESS

[75] Inventor: Hans O. Mieth, Büchen, Germany

[73] Assignee: Otto Tuchenhagen GmbH & Co. KG, Buchen, Germany

[21] Appl. No.: 150,206

[22] PCT Filed: Jun. 5, 1992

[86] PCT No.: PCT/EP92/01275

§ 371 Date: Dec. 6, 1993

§ 102(e) Date: Dec. 6, 1993

[87] PCT Pub. No.: WO92/21900

PCT Pub. Date: Dec. 10, 1992

[30] Foreign Application Priority Data

Jun. 7, 1991 [DE] Germany ............................ 41 18 874.8

[51] Int. Cl.⁶ .................. B08B 3/04; B08B 9/02; F16K 11/20
[52] U.S. Cl. .................. 137/15; 134/166 C; 137/240; 137/614.17; 137/614.18
[58] Field of Search ...................... 137/240, 312, 137/614.17, 614.18, 614.19; 134/166 C, 166 R

[56] References Cited

U.S. PATENT DOCUMENTS

| | | | |
|---|---|---|---|
| 4,304,251 | 12/1981 | Schadel et al. | 137/240 |
| 4,360,039 | 11/1982 | Jeppsson | 137/240 |
| 4,373,545 | 2/1983 | Knappe | 137/240 |
| 4,460,014 | 7/1984 | Mases | 137/312 |
| 4,605,035 | 8/1986 | Rasmussen et al. | 137/312 |
| 4,617,955 | 10/1986 | Melgaard | 137/240 |
| 4,655,253 | 4/1987 | Ourensma | 137/240 |
| 4,757,834 | 7/1988 | Mieth | 137/240 |
| 4,856,551 | 8/1989 | Brakelmann | 137/240 |
| 4,995,416 | 2/1991 | Mieth | 137/312 |
| 5,085,241 | 2/1992 | Mieth | 137/312 |

Primary Examiner—George L. Walton
Attorney, Agent, or Firm—David L. Davis

[57] ABSTRACT

Described are a procedure for cleansing double seat a valve, especially one operating with low or no leakage, and a valve arrangement for implementing the procedure which guarantees, among other things, that the cleansing of the relevant areas of the double seat valve is possible with a minimal, economical and environmentally friendly use of cleansing or disinfecting agents. In terms of industrial process engineering, among other things, a partial stroke of a closing member exposes a guide passage (A or C) in such a manner that the cleanser stream (R) branches off via the exposed guide passage (A or C) out of the valve housing part (1a or 1b), thereby cleansing the guide passage (A or C), and at least one of the following areas, the other guide passage (C or A), the leakage hollow space (6), and the seating surface (2a) which has been made accessible. For implementing the procedure it is suggested, among other things, that a bore (4d) be provided in axial alignment in the second rod (4b) which is connected with the guide passage (A) on the one hand and with guide passage (C) on the other. It is also proposed that the transmission path between the bore (4d) and the guide passage (A) contain a branching point (V), from which a further connection is created to an ring slot (9) formed between the first rod (3a) and the second rod (4b) which is coaxially conveyed in the first. It is suggested that the ring slot (9) provide a connection to the leakage hollow space (6). The cleanser stream (R) should be released, branching into partial streams ($R_1$, $R_2$) at the branching point (V) (Figure 3a), by exposure of the guide passage (A) by a partial stroke of the first closing member (3) against the opening movement (H) of the valve, or of guide passage (C) by a partial stroke of the second closing member (4).

23 Claims, 6 Drawing Sheets

PROCEDURE FOR CLEANING A DOUBLE SEAT VALVE AND VALVE ARRANGEMENT FOR IMPLEMENTING THE PROCESS

BACKGROUND OF THE INVENTION

The invention concerns a procedure for cleaning a double seat valve under the heading of claim 1 and a valve arrangement for implementing the procedure under the heading of claim 8 or 9. A method of the type characterized above is known from DE 31 08 778 C2. This procedure solves the problem of cleaning both seat surfaces of the closing members in a valve of the type under discussion simultaneously. In doing so, the cleansing and/or disinfecting agent is introduced either from outside the double seat valve through the leakage hollow space or through a valve housing part to both exposed seats (compare FIGS. 1–5*a* of the drawings).

In EP-A-0 208 126, the procedure known from DE 31 08 778 C 2 is further developed in such a way that in a double seat valve equipped with a slider and a seat plate, for the purposes of cleaning the seat of the slide type closing member, the seat is movable only in the direction of the associated valve housing, while the seat plate remains on its seat surface. The cleansing agent is introduced from outside of the double seat valve via the leakage hollow space to the exposed seating surface. This as well as the older procedure contributes to cleansing a relevant double seat valve area, namely the seat area. Nonetheless, in practice it is necessary to include other relevant areas in the cleaning procedure, those of the rod passage guides through the associated valve housing parts.

In valves with slide type closing members, it is necessary to take special precautions so that the compressive forces exerted by the fluid in the conduits upon the closing members can be absorbed. These forces may be compensated for either through suitable measures in the valve drive or through pressure compensating measures on the closing member in the valve housing area (cf. EP-A-00 39 319, FIG. 1; EP-A-0 208 126, FIG. 3.2). The former measure leads to driving gears of relatively large dimensions, while pressure-compensating measures on the closing member naturally require large rod guide passages, which are problematic simply because of their large sealing length with regard to their ability to be cleansed and their safety with reference to mixing product and cleaning fluid.

It is known from EP-A-00 39 319 that a chamber should be placed between the seals of the pressure compensating piston which can be rinsed by cleansing agents. In order to ensure sufficient cleansing agent throughput, there must be a sufficiently large static pressure where the cleansing agent enters. Nonetheless, for safety reasons, it is generally desirable that the cleansing agent is subject to as little pressure as possible on the rod seal facing the interior area of the valve housing. In any case, one must nonetheless take care that at certain time intervals the area behind the seal, with its relatively large circumferential length (into which, because of the actuating movement of the valve, product can occasionally be dragged), and the contact surfaces between seal and rod can be subjected to or irrigated by cleansing agents. It is shown in DE 37 01 027 A1(cf. FIGS. 7 and 8) how two particular sealing points arranged in series on the side of the housing which act together with a slide type closing member whose intermediate space can be rinsed from time to time in the area of one of the sealing points without having to expose the entire seating area of the closing member. While the previously cited figures show a one piece seal with two sealing points, the possibility of seal arrangements with two separate seals follows from the introduction of the description and the claims. Separate cleansing of two seals arranged at a distance on the side of the housing interacting with a slide-like closing member, or with a rod guided out of the valve housing by a partial displacement of the closing member or of the rod for the purpose of exposing one or the other seal to the valve housing part which contains the cleansing agent is explained in greater detail in publication W 0 88/05512(cf. e.g. FIGS. 21, 22; 25, 26 and 59, 60), which claims priority for the above named DE 37 01 0027.

Finally, it is clear from publication DE-U- 88 13 258 how a double seat valve having a closing member constructed as a seat plate and as a slider where the compressive forces on the slider are compensated by a pressure compensation cylinder constructed on the slider can be subjected to a cleansing in the seat region of the slider and in that of the pressure compensation piston guide passage through the valve housing parts with results known from the previously cited publications. It is clear that two parallel cleansing streams ($r_1$, $r_2$) branch off from the lower valve housing part. The one ($r_1$) proceeds to the valve region through the exposed seat surface of the slide type closing member over the leakage hollow space and a pipe leading downward from the valve housing part. The other stream ($r_2$) proceeds to this region over the exposed guide for the pressure compensation piston out of the valve housing part.

This well known solution possesses several disadvantages. First, the cleanser stream ($r_1$) which passes through the exposed seat surface of the slide type closing member is difficult to measure, meaning that an uncontrolled waste of cleanser with an associated environmental pollution is not impossible. Second, a second parallel cleanser stream ($r_2$) is necessary to cleanse an additional critical area of the double seat valve, the guide passage area of the pressure compensation piston of the one closing member. In addition, further equally critical areas of the double seat valve remain uncleansed. These areas are, under certain circumstances, the seat area of the closing member constructed as a seat plate, which occasionally comes into contact with product. In any case, these areas include the guide of the closing member activation rod through the overlying valve housing part and the sealing area between the activation rod of the slider-form closing member and the seat plate pipe surrounding this rod.

SUMMARY OF THE INVENTION

Proceeding from the aforementioned disadvantages and state of the art requirements, the present invention seeks to create a procedure of the type characterized in the introduction for ensuring the cleansing the relevant areas of a double seat valve with a minimal and economical use of cleanser and/or disinfectant which last, but not least, is environmentally friendly.

With the proposed procedure it is possible to cleanse the relevant areas of the double seat valve using a single cleansing agent stream, obtained using the partial stroke movement of a slide type closing member on its rod guide passage out of its associated valve housing part. By means of the partial stroke the guide passage (A or C) of the operating rod of the closing member is exposed to the valve housing, permitting the cleanser stream to enter there in order to cleanse the activation rod guide at the branch off point, and at least one of the following areas, the other rod guide passage, the leakage hollow space and the seat area, which has been made accessible.

The proposed procedure can be used to particular advantage in an initial refinement when the two valve housing parts are basically arranged vertically one upon the other and cleansing agent is available in the upper valve housing part. In this case, the cleansing stream cleanses successively, without further branching, in any order (preferably proceeding downward) at least one of the aforementioned relevant areas of the double seat valve. Since the stream is conveyed to the seat area which has been rendered accessible basically as a spray stream, and to the two successive areas as a quasi swarming film under the influence of gravity, no harmful elevations in pressure occur in this proceeding. Nonetheless, this advantageous procedure variant is dependent upon the position of the valves and is hence restricted to a specific if relatively large number of applications.

If, as the proposed method alternatively likewise implies, the cleanser stream can only be obtained at the other, lower rod guide passage (C), whereby at least the upper rod guide (A) is cleansed and subsequently, the cleanser stream continues downward into the seat region which has been made accessible, or into the leakage hollow space, then it is necessary that it be available on the rod guide passage (A) subjected to a sufficiently high pressure in order to assure a sufficiently effective cleansing in the downstream areas. Over against this basic disadvantage stands the advantage generally obtainable by the arrangement in series of the areas to be cleaned that the same cleansing agent stream cleanses all areas, so that the goal pursued by the invention is most effectively reached.

A further advantageous embodiment of the proposed method permits installation of the double seat valve (hereinafter also abbreviated as valve) independently of position, whereby the cleansing agent stream can be obtained from the one as well as the other valve housing part without having to accept the disadvantage of the last mention method. This is accomplished by branching the cleansing agent stream behind the rod guide passage at the branch off point into partial streams $R_i$ which cleanse the relevant areas of the double seat valve, which can be arranged side by side or one behind the other. The total stream R and its partial streams R1are thereby conducted as forced currents into the areas to be cleansed. Thereby it can always be assured that the respective critical rod guide passage is an end point for a partial stream, not an intermediate station.

In most applications, it is sufficient (as one further development of the proposed method provides) to split the total stream R into two partial streams, $R_1$ and $R_2$. One, $R_1$, cleanses the seat area which has been made accessible and the leakage hollow space, while the other, $R_2$ cleanses the other rod guide passage (C) or (A).

A defined adjustment and measurement of the partial stream amounts or the relationship of the partial streams to each other is possible. As a rule, several times the amount of cleansing agent is necessary for cleansing the accessible seat area and the leakage hollow space of the valve than for cleaning a rod guide passage. For this reason, adjusting the relationship between the these partial streams, for example the partial streams $R_1$ and $R_2$, with $R_{1/R2} > 1$, is indicated.

The proposed method may be applied to double seat valves with two slide type closing members and to double seat valves with a slide type closing member and a seat plate. In the latter closing member configuration, the seat plate remains on its seat area and the slide type closing member is moved from it by the partial stroke. The seat area of the seat plate is thus not cleansed in the course of applying the proposed procedure. To the extent that the double seat valve is provided with two slide type closing members, the invention procedurally suggests two partial stroke variants. One variant is characterized by the closing members being moved by opposed partial strokes. The cleansing agent stream branches off at the rod guide passage where the partial stroke runs against the direction of the valve opening. In the other variant, the closing members are moved by partial strokes in the same direction. The cleanser stream branches off at the rod guide passage of that closing member where the partial stroke runs against the opening direction of the valve and which is dependently driven.

It is possible, using a suitable adjustment drive, to implement both forenamed partial stroke variants on the same valve arrangement. Hence it is now possible to guarantee the advantages attainable of the present invention to the full extent in every case on the same valve, regardless of whether the cleansing agent is available in one valve housing part or the other. For the case for example where the valve opens downward and the cleanser is available in the upper valve housing part, while the lower valve housing when necessary is loaded with product, provision of the cleansing agent stream over the upper rod guide passage is obtained by way of an opposed partial stroke movement. Where in the same valve cleanser is available in the lower valve housing part, the lower rod guide passage can be exposed by a partial stroke movement in the same direction against the opening direction of the valve, so that the cleanser stream can now be branched of from the lower valve housing part. The upper valve housing part can thereby at times be loaded with product. Both partial stroke variants allow a displacement of the closing member which at times is loaded with by product in the direction of the product conducting valve housing part. The seat area formerly loaded with product which is covered by the closing member is made available for the cleansing agent stream out of the leakage hollow space.

Cleansing agent is not available in every case which occurs in practice in at least one of the valve housing parts, so that the above proposed procedure cannot be applied. In addition, the method initially suggested is not applicable when product is present in both valve housing parts. Nor is it applicable if a cleansing of the relevant areas of the double seat valve is necessary without restriction in its closed position as well as in restricted form in its open position, namely a cleansing of all areas with exception of the exposed seat areas.

It is known from the initially cited EP-A-0 208 126 that when previously mentioned operating conditions are present, cleansing of the seat surface of the slide type closing member which is if necessary loaded with product takes place by the introduction of cleanser from outside of the double seat valve over the leakage hollow space. A cleansing of the rod guide passages in principle likewise possible by introducing cleanser from outside and under relatively high pressure, which is conducive to an intensive cleaning. It is prohibited for safety reasons. Already at the design level, a seal which on the one hand stands under product load must be prevented from being subject to cleanser under pressure on the other.

In order to ensure a loading with cleansing agent of the rod seal which is possibly loaded with product, introducing the latter to the immediate seal area under as little pressure as possible has been suggested. It is self evident that a cleansing agent subject to pressure conditions of this type cannot be used for further cleaning purposes in a double seat valve. The preconditions for a cleansing of the relevant areas of a double seat valve with minimal, economical and last but not least environmentally friendly use of cleansing and disinfecting agents fail from the start with cleansing technological solutions of this sort. These preconditions consist in the fact the cleansing agent stream cleans all cleansing technologically relevant areas of the double seat valve.

In view of the disadvantages just presented and the state of the art requirements, it is also the goal of the present invention to create a procedure of the type named at the outset which in providing cleanser from the surroundings of the double seat valve solves without restriction the relevant problem of assuring cleansing of the relevant areas of a double seat valve with minimal, economical and lastly (but not least) environmentally friendly use of cleansing and/or disinfecting agent.

The same advantages are attainable for double seat valves in which the cleanser must be introduced from the surroundings of the valve (since in the valve housing no cleanser is available, or operations require the presence of product) with the procedure now proposed as for those double seat valves where the "valve housing" is available as a source of cleansing agent through the partial stroke of the closing member and the associated exposure of a rod guide. The two alternatively proposed procedures differ solely in terms of the position or type of cleanser source. In the method now proposed, the cleanser stream is introduced from outside the double seat valve through an introduction point (E), where it cleanses the rod guide (A or C) on the valve housing side of the introduction point and at least one of the following areas: The other rod guide passage (C or A), the leakage hollow space, and the seat area, or the seat area which has been made accessible.

Since a partial stroke of at least one closing member can be dispensed with because there is no longer a need to expose the rod guidance to the valve housing part, the drive of a double seat valve cleansed in this manner is particularly simple. Indeed the procedural partial stroke variants proposed above may be used without restriction in connection with the cleansing procedure now proposed as well. The same applies for the proposed basic structure of the valve arrangement and advantageous refinements of it.

That the procedure now proposed can use the advantages of the procedure suggested at the beginning almost without restriction results in the final analysis from the fact that it is based upon a fruitful procedural variant of the latter. Among other things, it consists of branching the cleanser stream obtained in the valve or now introduced from the valve surroundings at a branching point (V) into partial streams $R_1$. A throttle gap is provided between the branching point and the neighboring rod seal. A partial stream (r) is throttled in the throttle gap. It cleanses the rod seal almost without pressure and is subsequently conducted to the valve surrounding. The other partial stream (R), or the partial streams ($R_1$, $R_2$) continue unthrottled from the branching point and clean the other relevant areas of the valve, to be sure basically according to one of the advantageous refinements of the procedure proposed initially.

A refinement of the valve arrangement of almost the same construction for implementing the method now in proposed in the area of the rod guide passage works through the use of a similarly constructed insert between the housing and the pressure compensation piston or pipe. This insert forms on the one hand the necessary throttle gap with the pressure compensation piston or the pipe, and includes on the other a drain hole for draining the partial stream (r) from a chamber adjacent to the rod seal in part formed by the insert into the valve surroundings.

The valve arrangement for implementing the procedure initially proposed finds its most advantageous embodiment when both closing members are constructed as slides and the valve opening direction runs from top to bottom. In this case, the branching off of the cleansing agent at the upper rod guide passage (A) occurs through a partial stroke of the upper slider directed against the opening movement of the valve. At the same time, the lower slide type closing member is displaced downward for a counter partial stroke, so that now both seat surfaces are exposed as before in the closed position of the valve. Cleanser branched off from the upper valve housing part at first cleanses the upper rod guide passage, subsequently proceeding to the exposed seat area and the adjacent leakage hollow space of the valve finally to pass within the pipe extending downward as a drizzle film and from there to exit into the valve surroundings. The valve arrangement for implementing the proposed procedure with branching of the total stream R into two partial streams $R_1$ and $R_2$ is characterized by, among other things, that the cleanser stream R obtained at the upper rod guide passage (A), or alternatively at the lower rod guide passage (C), is first conveyed to a branching point, whence it branches into the partial streams $R_1$ and $R_2$. Partial stream $R_1$ goes to the leakage hollow space of the valve via a connection of the branching point with the ring slot, while partial stream $R_2$ is conducted from the branching point out of a axially disposed bore in the inside control rod, and from there to the other rod guide passage (C) or else to the rod guide passage (A). The valve arrangement with a branching of the total stream R is, as already presented above, applicable independently of position, especially in a horizontal arrangement as well. The latter is particularly advantageous when such valves are placed at tank discharges. On the one hand, the erection height of the tank is considerably reduced, and on the other, the valve housing part loaded with product can be disposed directly on the tank. The cleansing agent stream at the rod guide passage can be measured under controlled conditions at the point of origin or at another point in the successive path of the stream according to the type of branching. In those valve arrangements in which the cleanser stream is conducted through the valve via a forced flow and subsequently in cleansing the rod guides in branched off into partial streams and the branching off point, the partial stream designated to cleanse the other rod guide passage passes through a throttle gap before reaching this unexposed rod guide passage. This measure assures that no impermissible pressure buildup occurs because of the cleanser on the associated rod seal, which occasionally is loaded by product. The partial stream allotted to the seat areas made accessible and the adjacent leakage hollow space is not critical with regard to pressure buildup, because it enters this area which is associated with the valve surroundings through an aperture of large cross section almost as a free spray stream.

In order to keep the necessary operating forces of the proposed valve arrangements as small as possible, the closing members in the area of their respective associated valve housing parts may be so constructed that the compressive forces exerted by the fluid in the valve housing parts on the closing members are largely compensated. For this purpose, the diameter of the first operating rod is increased to the valve seat diameter in the form of a pressure compensation piston in the area of its guide passage (A).

If the diameter of the pipe associated with the second operating rod is increased in its overall extension area between the closing member and its guide to approach that of the valve seat (as a further advantageous refinement provides), there first result suitable conditions for the formation of a cleanser drizzle film on the inner wall of the pipe in case the cleanser stream, without further branching, successively flows through the cleansing technologically relevant areas of the valve. Second, there result conceivably suitable conditions with respect to avoiding a pressure buildup in the leakage hollow space, for example, as a consequence of defective seat seals or as a result of an unplanned or undesired opening of the upper closing member. In order that the cleanser stream for the above named partial stroke variants can be realized with the same development of the proposed valve arrangement, a remotely controlled connecting opening for draining partial stream $R_2$ of the cleanser stream is provided in the area above the first rod seal or below the second rod seal. In case partial strokes in the opposite as well as in the same direction are to be implemented in the proposed valve arrangements, the individual partial strokes are subjected to particular measuring criteria, as a further advantageous refinement of the valve arrangement provides in accord with the invention. Exposing the respective rod guide passage necessarily requires on the one hand a particular minimum stroke. On the other hand, this minimum stroke may not be attained if this rod guide passage should not be exposed. The stroke direction in same direction partial stroke motion nonetheless agrees with the direction of the partial stroke for exposing the guide passage because of the necessary exposure of the seat area. In these cases, the respective closing member implements the partial strokes which run indeed in the same direction but are of different magnitude. Since the axial extension of the common seat area of both closing members is nonetheless restricted, and in a partial stroke movement in the same direction the closing members necessarily have a small clearance of the respective end of the seat surface, an advantageous refinement of the valve arrangement provides that the closing members, in relation to their resting position in the closed position of the valve arrangement, are arranged axially displaced in the direction of the second closing member. The partial stroke variant in the same direction is not critical with regard to maintaining necessary clearances from the edges of the seat surfaces, since the closing member adjacent to the edge of the seat surface must accordingly execute a basically greater partial stroke in the same direction partial stroke variant.

BRIEF DESCRIPTION OF THE DRAWINGS

An application of the valve arrangement for implementing the proposed method is presented in the illustration and is described in the following material. The illustrations depict.

DETAILED DESCRIPTION

A double seat valve (FIG. 1, 1a) whose valve housing 1 is formed by valve housing parts 1a and 1b, has a seat ring 2 passing through these valve housing parts in their connecting area. In the latter, within a cylindrical seat surface 2a, are two slide type closing members 3 and 4 are arranged glidingly displaceable, and over seat seals 13 or 14, radially sealingly displaceable, and over seal 13a or 13, even axially sealingly displaceable toward each other. The lower closing member 4 is extends into a pipe 4a whose diameter is enlarged along its entire extension area between closing member 4 and its guide passage (C) through the lower valve housing part 1b to approximate the valve seat diameter. Pipe 4a forms on the one hand the connection between a leakage hollow space 6 formed between closing members 3 and 4 in the closed as well as the open position of the valve, and the valve surroundings. On the other hand, it forms the pressure compensation cylinder for compensating compressive forces exerted by the fluid in valve housing part 1b on closing member 4. Pipe 4a is sealed off in valve housing part 1b by a second rod seal 7. It is additionally radially conducted via a guiding ring 11 into a tubular insert in valve housing part 1b which is not described in greater detail. Closing member 4 is connected over pipe 4a and a connecting part 4c with a second operating rod 4b conveyed to a control arrangement D which is placed above the valve, but is not shown in the present case. The second operating rod 4b is coaxially enclosed by pipe 4a, whereby within connecting part 4c at least a second supply bore 4f is disposed, which creates a connection between a second chamber 10 below the second rod seal 7 and a bore 4d disposed in axially inside the second operating rod. The first closing member 3 is equipped with a first operating rod 3a constructed as a hollow rod mounted on the second operating rod 4b of the second closing member 4, which widens in its guide passage area (A) through the valve housing part 1a into a pressure compensation piston 3b enlarged in diameter to the valve seat diameter. This separates a first chamber 8 from valve housing part 1a via a first rod seal 5, whereby a second guide ring 12 acts to guide operating rod 3a which leads out of valve housing part 1 a in the area of components of the guide not described in greater detail, and which finds an extension in connection with pressure compensation piston 3b.

Figure 1:
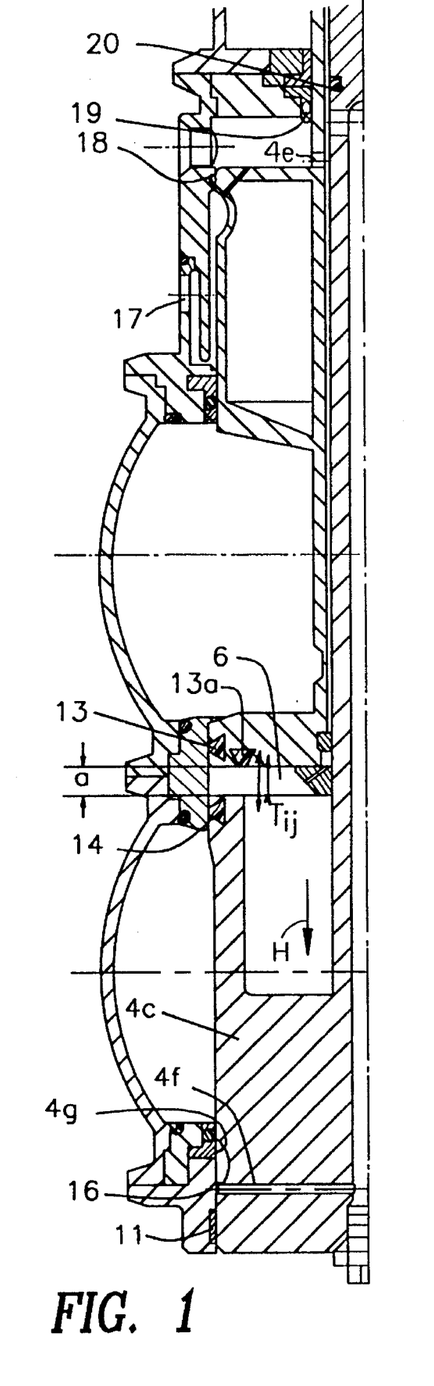
FIG. 1, 1a respectively, a cross section through a valve arrangement according to the invention in its closed position, whereby the seal arrangements are designed differently in the first closing member.
Figure 1A:
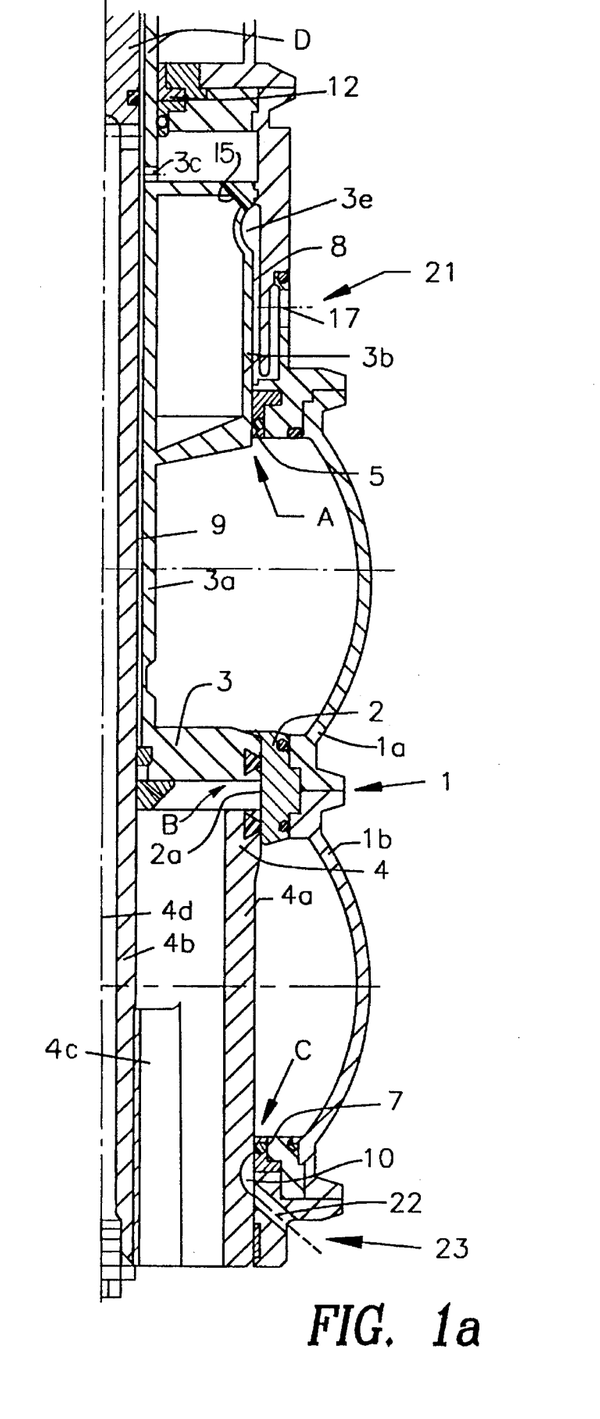

A ring slot 9 formed between the first operating rod 3a and the second operating rod 4b which is guided coaxially therein is connected on the one hand with leakage hollow space 6 and on the other with bore 4d via a first supply bore 4e in the area of its end which faces away from leakage hollow space 6. The first chamber 8 has a first outlet orifice 17 above the first rod seal 5 operable via a remotely controllable first closing arrangement 21. The second chamber 10 is provided with a second outlet orifice 22 below the second rod seal 7 remotely controllable by a second closing arrangement 23. At the end facing away from first rod seal 5 first chamber 8 widens in diameter as a result of an annular groove 3e formed in pressure compensation cylinder 3b, which in the illustrated closing position of the valve is connected via a first throttle gap 15 with an annular space lying above which is not further described. The latter is connected with ring slot 9 via at least one connection bore 3c. Sealing of pressure compensation piston 3b above the first groove 3e toward the valve housing part bordering upon it (not further described) is assured via a third rod seal 18. A fourth rod seal 19 provides for a housing side seal of the first operating rod 3a which extends above the pressure compensation piston 3b. A fifth rod seal 20 between the first and the second operating rod 2a or 4b forms the demarcation of the part of ring slot 9 which stands in connection with leakage hollow space 6. A second annular groove 4g is provided in pipe 4a above the second rod seal 7 which is connected with the second supply bore 4f through a second throttle gap 16. The second annular groove 4g widens into the second chamber 10 in the valve closing position depicted. Another advantageous embodiment of the valve arrangement provides a group of second grooves 4g in this area, whereby the group is formed by grooves separated from one another oriented in the direction of the valve axis, or inclined toward it distributed over the circumference of pipe 4a. An adequate representation at the upper rod guide passage is Visible in FIG. 3a. The areas of the double seat valve relevant in the course of applying the proposed method are characterized in a particular manner by (A), (B) and (C). The guide passage of the first operating rod 3a (in the region of its pressure compensation piston 3b) carries the designation (A). The leakage hollow space 6 and the adjacent seat area which is to be made accessible to the cleanser stream is designated (B), and the guide passage of pipe 4a through the lower valve housing part 1b bears the designation (C). The equilibrium position clearance of closing members 3 and 4 is designated with a, possible same or opposite direction partial strokes bear the designation $T_{ii}$, and H designates the opening direction or the opening stroke of the valve arrangement.

Figure 2:
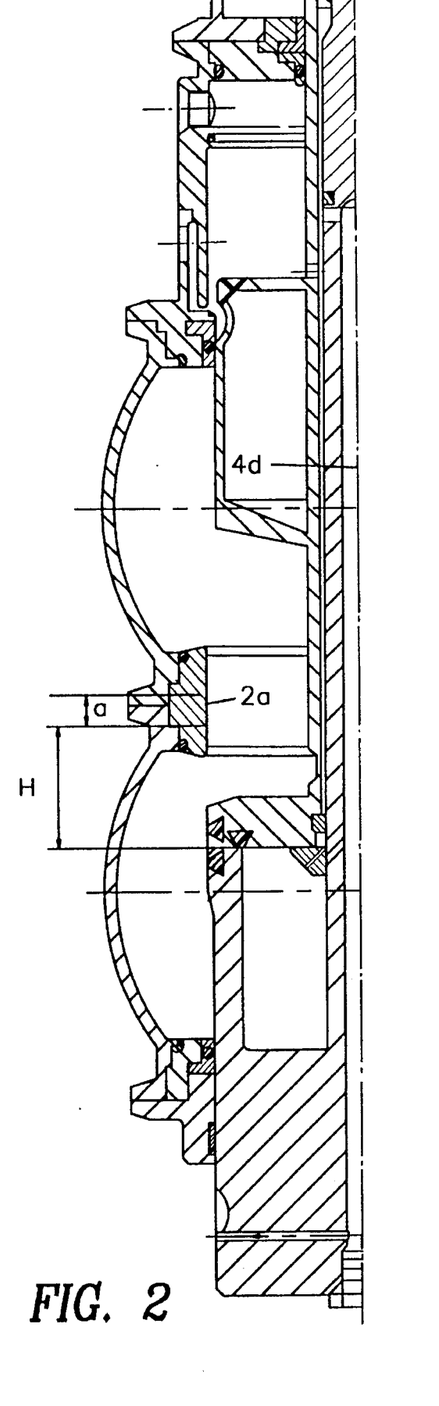
FIG. 2, 2a the valve arrangement according to FIG. 1 or 1a in their open position.
Figure 2A:
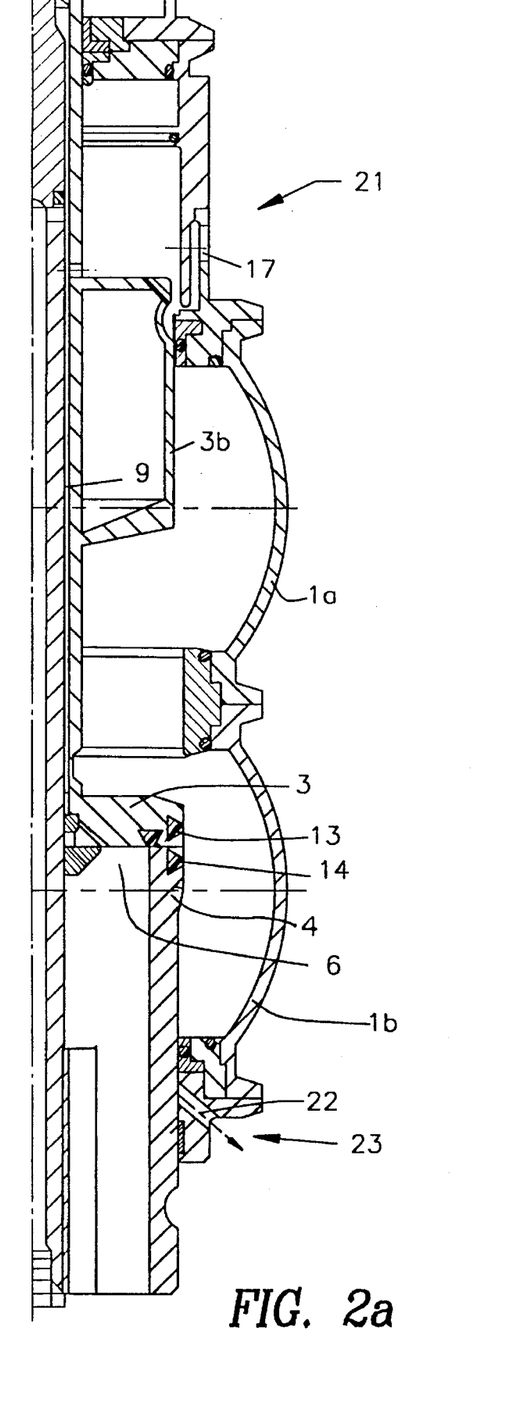

FIG. 2 and 2a depict the open position of the proposed valve arrangement, whereby closing members 3,4 are displaced downward out of their seat surface 2a and their equilibrium position clearance a for the opening stroke H. In the embodiment according to FIG. 2a the first seat seal 13 has in first closing member 3, in addition to its radial sealing action toward seat surface 2a on contact of closing members 3,4 with each other, an additional sealing action oriented in an axial direction toward the second closing member 4, so that the leakage hollow space 6 is likewise closed to second valve housing part 1b. This embodiment guarantees an almost leakagefree operation of the valve arrangement, as the space between closing members 3,4 when brought together on the one hand and seat surface 2a on the other is minimized. Outlet orifices 17 and 22 are opened in the present case, since the remotely controlled closing arrangement is not actuated. A closure of this outlet orifice would nonetheless be equally possible in this valve position.

Figure 3:
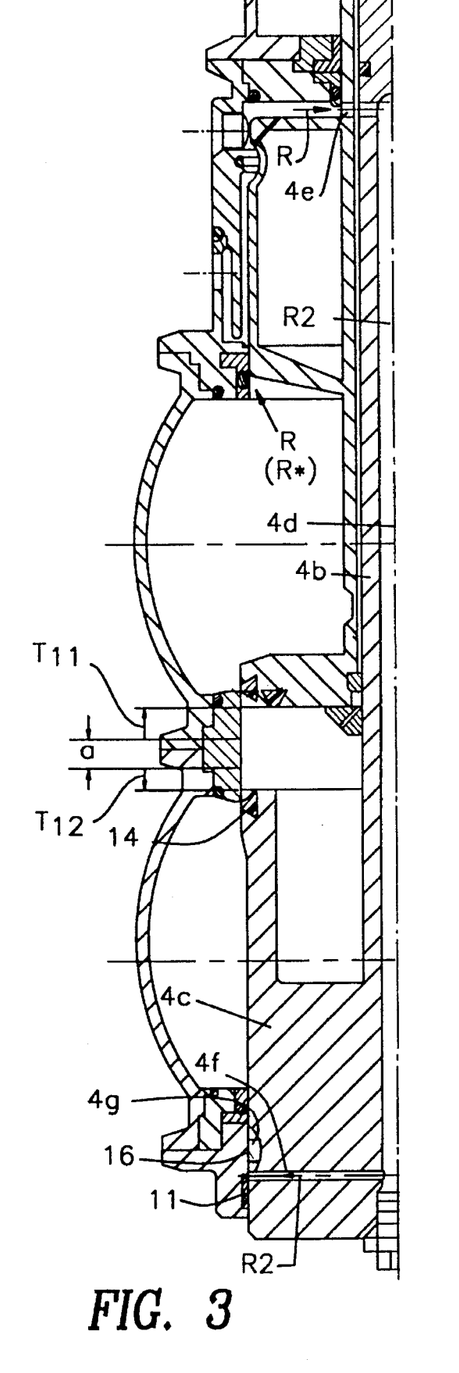
FIG. 3 the valve arrangement according to FIG. 1 in its cleaning position with an exposure of the upper rod guide passage (A) and with a branched cleanser stream (same direction partial stroke movement)
Figure 3A:
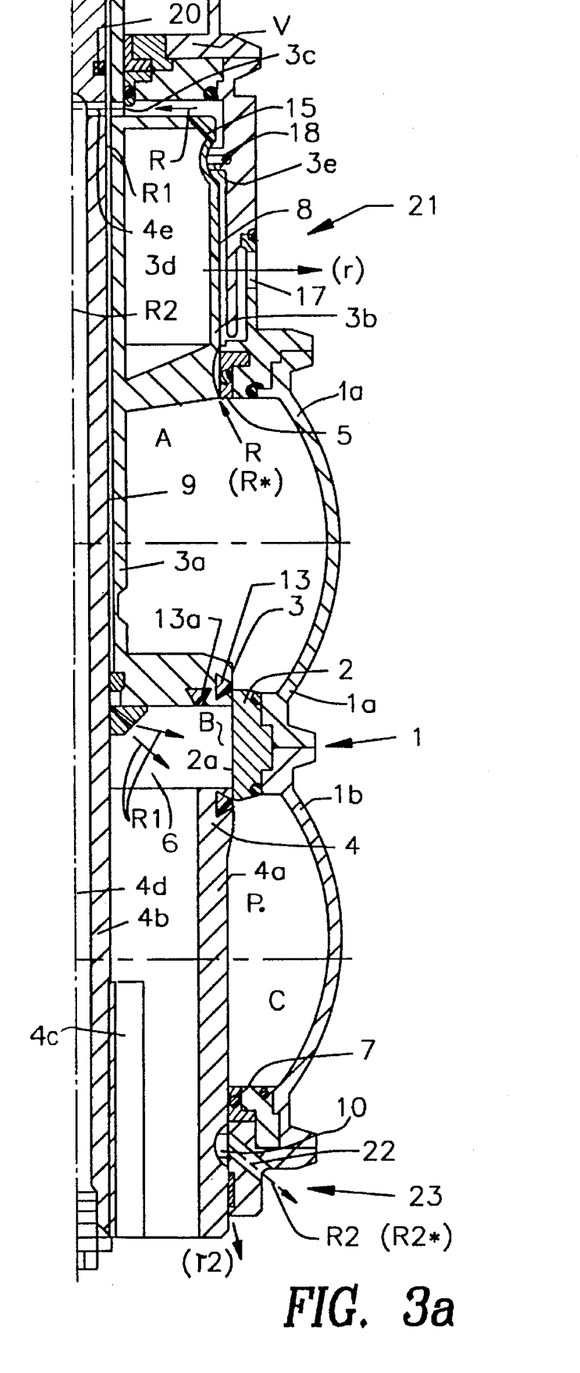
FIG. 3a the cleansing position of the valve arrangement according to FIG. 3 with a modified design of the branching point for the cleansing agent in the rod guide passage region (A)

It is apparent from FIGS. 3 and 3a that in a displacement of the first closing member 3 by means of its operating rod 3a for partial stroke $T_{11}$ in the direction of valve housing part 1a that the sealing point of the pressure compensation piston which acts in concert with the first rod seal 5 in the closed position of the valve is likewise displaced for this partial stroke in the direction of first chamber 8. At the same time, the second closing member 4 is displaced by its operating rod 4b by the opposed partial stroke $T_{21}$. The pressure compensation piston 3b is necessarily so constructed in the region of first rod seal 5 that the guide passage (A) to the first chamber 8 is exposed with partial stroke $T_{11}$ so that a cleanser stream R branches off from the valve housing part and is guided through the exposed guide passage (A) and into adjacent first chamber 8. From thence, the stream proceeds to ring slot 9 via connection bore 3c. Here it branches at branching point V into partial streams $R_1$ and $R_2$. Partial stream $R_1$ proceeds via the extending ring slot 9 into leakage hollow space 6 and the adjacent seat area 2a, which has been made accessible. Both areas are designated (B). Partial stream $R_2$ flows over first supply bore 4e into bore 4d, from there over the second supply bore 4f and the second throttle gap 16 of second chamber 10 below the second rod seal 7. Pipe 4a and the first guide ring 11 can be so dimensioned to each other that the passage of a relatively small partial stream ra into the valve surroundings is possible, while the remaining, basically larger component $R_2$, flows off via the second outlet orifice 22. In the area of leakage hollow space 6, partial stream $R_1$ is guided to the adjacent seat surface 2a, made accessible for same direction partial strokes $T_{11}$ and $T_{21}$, passing from the free seat surface of closing members 3,4 with their equilibrium clearance a. After the first area relevant for cleansing technology, guide passage (A), is subjected to cleansing, the second and third areas, (B) and (C), are thereby subjected to such in a quasi parallel fashion. Outlet orifice 17 is closed by closing arrangement 21, so that the cleanser stream obtained at the guide passage (A) is compelled to enter into cleansing technologically relevant areas (B) and (c).

In case cleansing of the labyrinthine first chamber 8 which branches to outlet orifice 17 is indicated, a relatively small partial stream r can be admitted via outlet orifice 17. This partial stream must be taken into account in apportioning total stream R (increased to R,). The first recess 3ein pressure compensation piston 3b is so positioned in relation to the third rod seal 18 that an unimpeded passage of cleansing agent stream R from first chamber 8 into ring slot 9 is possible. The first throttle gap 15 is passed around almost as in a bypass, so that cleansing stream R remains unthrottled at this point. By way of contrast, second throttle gap 16 fulfills its throttle role and impedes partial stream $R_2$ from causing any impermissible pressure buildup on second rod seal 7, which may be loaded with product.

Figure 4:
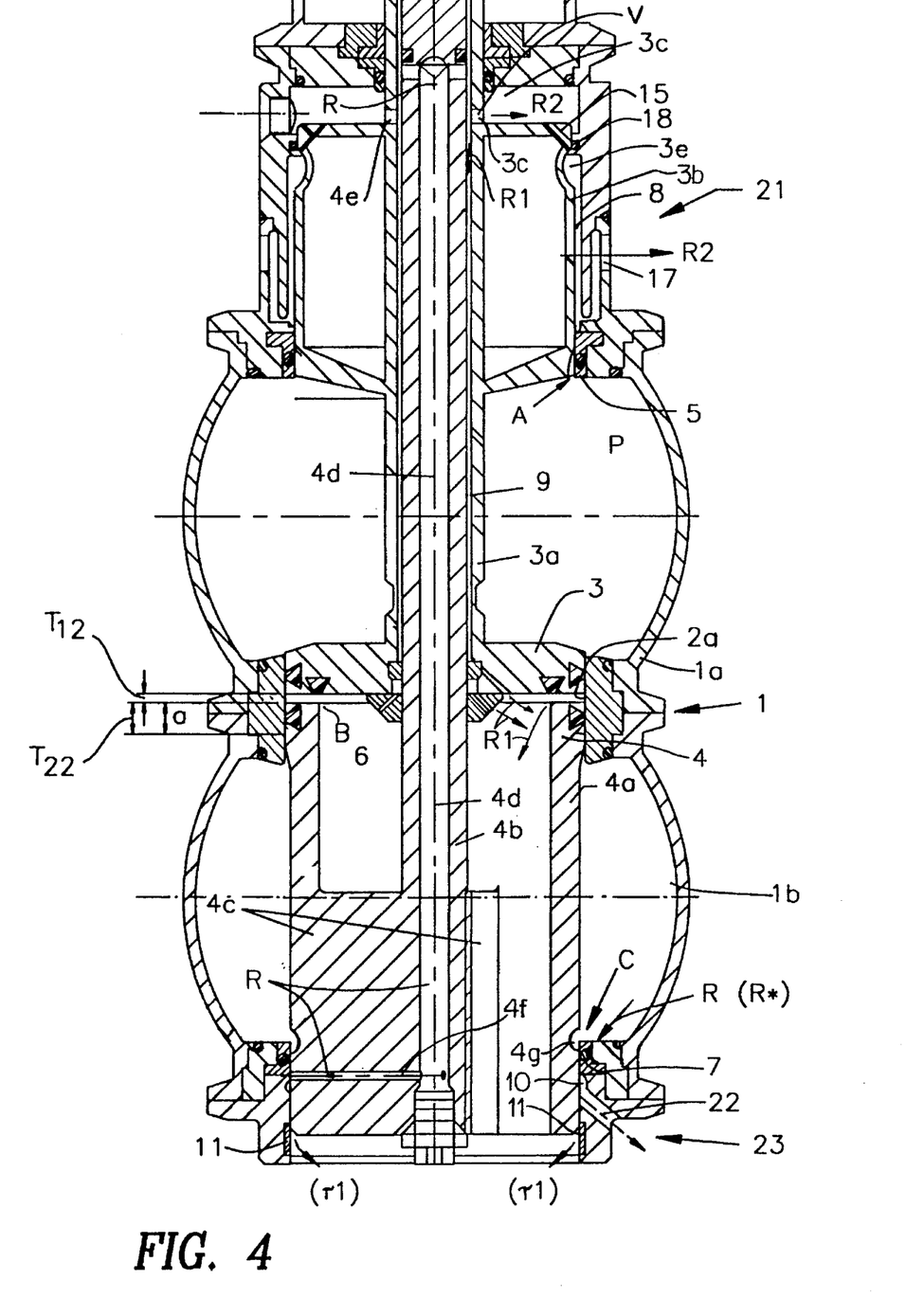
FIG. 4 the valve arrangement according to FIG. 1 in its cleaning position with exposure of the lower rod guide passage (C) and with a branched cleanser stream (same direction partial stroke movement and FIG. 5 a schematic representation of the partial strokes likewise realizable in the same or opposite direction in the valve arrangement according to FIG. 1.

The alternative cleansing method, in which the cleansing stream R is branched off at guide passage C of pipe 4a through partial stroke $T_{22}$ of the second closing member 4 by means of its operating rod 4b in the direction of the first valve housing part from lower valve housing part 1b is presented in FIG. 4. At the same time, there follows a same direction displacement of first closing member 3 by its operating rod 3a for partial stroke $T_{12}$ It is advantageous to dimension pipe 4a in the region of the first guide ring 11 so that there a relatively small partial stream $r_1$ of cleansing agent can emerge into the valve arrangement surroundings. Depending upon the size of this partial stream, a cleanser stream R, is branched off at guide passage C of pipe 4a in the second valve housing part 1b, assuring the necessary cleanser stream R for the other two areas A and B. The stream arrives unthrottled via second recess 4g in the region of second rod seal 7 at second supply bore 4f and from thence in bore 4d to enter ring slot 9 from her via first supply bore 4e. A branching into partial streams $R_1$ and $R_2$ at branching point V in the connection bore 3c region. Partial stream $R_1$ flows into leakage hollow space 6 and adjacent exposed seat area 2a, as previously depicted in FIG. 3. Partial stream $R_2$ arrives in first chamber 8 via first throttle gap 15, the chamber being sealed off from the annular space above pressure compensation piston 3b by third rod seal 18. Outlet orifice 17 is open, so that cleansing agent stream $R_2$ can emerge in the valve arrangement surroundings out of cleansing technologically critical area (A) above first rod seal 5. Since partial stream $R_2$ necessarily must pass first throttle gap 15, an impermissible pressure buildup in cleanser stream $R_2$ above first rod seal 5, if necessary loaded by product, is safely avoided.

Components and designations indicated in FIGS. 2–4, but not further explained in their associated description, or components indeed mentioned in the description, but not drawn in the Figures are discussed in detail in the descriptions for FIGS. 1 and 1a. To the extent that the interior space of valve housing parts 1a,1b is referred to by P, this means that product can on occasion be present there during the cleaning procedure. To the extent that the alternative cleansing procedures should be applied optionally, as needed, by exposure of guide passage (A) or guide passage (C), outlet orifices 17 and 22 may be opened and closed by remote control for discharging partial stream $R_2$.

Figure 5:
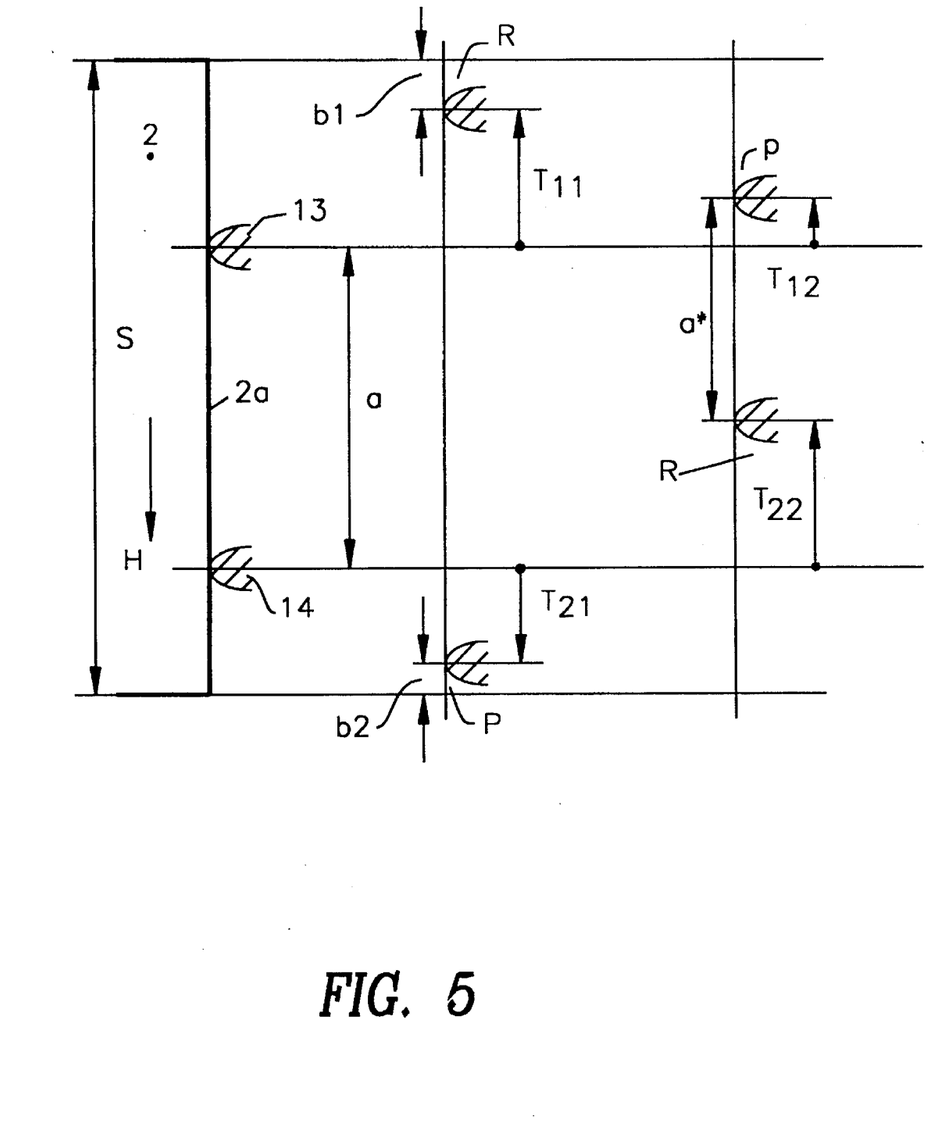

Partial strokes necessary for the alternative cleansing procedures are depicted in FIG. 5. The axial extension of seat surface 2a is referred to as S and the opening direction of the valve arrangement as H. The left part of the illustration shows the first and second seat seal 13 or 14 in their equilibrium position, that is, in the closed position of the valve arrangement, whereby equilibrium clearance a is provided. It is clear that seals 13, 14 and thereby closing members 3,4 are arranged axially displaced in the direction of the second closing member 4 within seat surface 2a. In the middle illustration, seals 13, 14 assume their respective outer end positions when they are displaced for opposed partial strokes $T_{11}$ or $T_{21}$. First seat seal 13 has thereby a marginal clearance $b_1$ to the upper end of seat surface 2a, while second seat seal 14 has a marginal clearance $b_2$ to the lower end of seat surface 2a. In the right hand illustration, closing members 13, 14 are displaced from their equilibrium position for same direction partial strokes $T_{12}$ or $T_{22}$.

It is further evident that partial strokes $T_{11}$ and $T_{21}$ or $T_{12}$ and $T_{22}$ are different. This necessarily results from the fact that guide passage (A) must be opened by partial stroke $T_{11}$, while partial stroke $T_{21}$ merely causes the exposure of the seat surface of second closing member 4, which can be loaded by product. Partial stroke $T_{11}$ is hence larger than partial stroke $T_{21}$ (on this, cf. also FIG. 3).

The opening of guide passage (C) of pipe 4a takes place in same direction partial stroke movement (compare the right hand illustration in FIG. 5 and Figure.4) by partial stroke $T_{22}$, while $T_{12}$ again merely exposes the seat surface of first closing member 3. For this reason, partial stroke $T_{22}$ is here designed to be greater than partial stroke $T_{12}$, whereby it is assured, however, that after completion of same direction partial strokes $T_{12}$ and $T_{22}$, the second closing member 4 is not in the very position which first closing member 3 previously occupied in its closed position before it completed partial stroke T[<i]nf12. To ensure satisfactory cleaning of the first closing member 3, second closing member 4 should not yet have reached the closed position of first closing member 3 following completion of partial stroke $T_{22}$. A sufficient safety clearance $a_1$ is provided.

The previous exposition necessarily leads to the conclusion that closing members 3, 4 in their closed position cannot be grouped around the axis of symmetry which is vertically oriented toward the rotation axis of seat ring 2. Rather, they are positioned asymmetrically in seat ring 2.

The proposed method and the valve arrangements presented as suggestions for its implementation now in fact make it for the first time possible to subject all relevant areas of a double seat valve to cleansing with a single cleansing agent stream successively, or by branching the stream behind the exposed guide passage, also parallel or in series, with minimal, economical and environmentally friendly sue of cleansing and/or disinfecting agents.

The procedures in accord with the invention are indeed not solely applicable to the concretely proposed valve arrangements above. They are also valid for the majority of the closing member configurations, opening directions and partial stroke variants which have become known in the publications mentioned above. They are, as already explained, applicable to double seat valves which are equipped on the one hand with a seat plate and with a slide type closing member on the other. Only those arrangements are to be excluded in view of the requirement for leakage free operation in which the slide type closing member executes a "collection movement" in the direction of the seat plate in the course of the opening movement of the double seat valve (on this see DE 31 08 778 C29). With respect to the control arrangements for the operating rods which guarantee the proposed methods, the only requirement is that these must permit the opening movement of the double seat valve with the opening stroke H on the one hand, and that on the other, they must permit the opposite direction partial strokes $T_{11}$, $T_{21}$ or the same direction partial strokes $T_{12}$, $T_{22}$ in realizing alternative cleaning procedures on the same valve arrangement.

The position of branching point V is selected in the form of construction only as an example. Instead of its arrangement in ring slot 9, the point can also be provided at another place in the valve in transporting cleanser over bore 4d preferably between the end and the guide passage (A). If, for example, it is positioned near the guide passage (A), a partial stream directed through a throttle position 15 can almost be guided without pressure from here to the rod seal of guide passage (A) and further into the valve surroundings, while the other partial stream from branching point V cleanses the major portion of the rod guide passage (A) unthrottled, and is brought via ring slot 9 to leakage hollow space 6 and seat area 2a, which has been made accessible. In the closed and open position of the valve, the connection of the area immediately behind the valve seal (A) with the valve surroundings via outlet orifice 17 (which is basically designed for the discharge of the cleanser stream) almost represents a leakage control opening which provides information on the status of the rod seal.

Figures 6, 7:
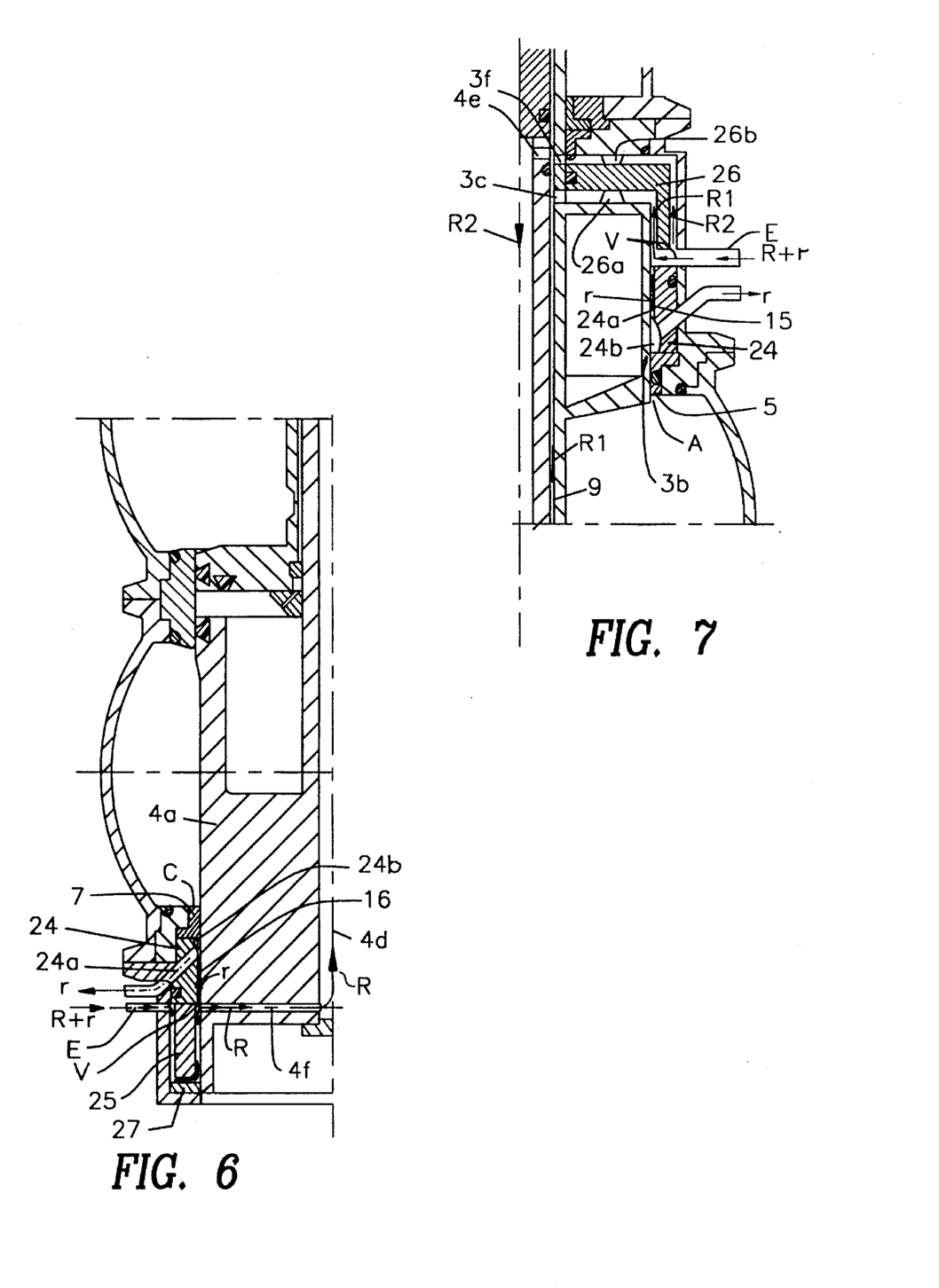
FIG. 6 a cross section through a valve arrangement according to the invention in the area of the rod guide passage (C) facing away from the control arrangements, whereby the cleanser source is provided in the surroundings of the double seat valve.
FIG. 7 a cross section through a valve arrangement according to FIG. 6 in the area of the rod guide passage (A) facing toward the control arrangements.

It is not necessary to go into the basic construction of the valve arrangement in FIGS. 6 and 7, as they have been sufficiently explained in FIGS. 1–4. Only particularities in the rod guide passage area need to be discussed.

An insert 24 is placed between pipe 4a and a housing which is not further described, which forms with pipe 4a the throttle gap 16 and contains a discharge bore 24b for draining partial stream (r) out of a chamber 24b adjacent to rod seal 7 and partially formed by insert 24 into the valve surroundings (FIG. 6). A similarly constructed arrangement is found in FIG. 7. Throttle gap 15 is here formed between insert 24 and pressure compensation piston 3b.

A first flow path guide 25 is placed below insert 24 (FIG. 6) which brings the cleansing agent (R+r) introduced via an introduction point (E) to the region of the lower end of pipe 4a, diverts it, and subsequently cleanses a part of the jacket surface of pipe 4a. The cleanser stream (R+r) branches into partial streams (R) and (r) at the branching point (V). Partial stream (r) is subjected to throttling in throttle gap 16 and arrives almost pressureless in neighboring rod seal 7 to pass via discharge bore 24a into the valve surroundings. Partial stream (R) flows unthrottled over supply bore 4f to other relevant areas of the valve in order to be subjected to further treatment in accord with the proposed method. A guide and wiper part 27 impedes the introduction of crude contamination form the valve surroundings into the valve guide passage region and serves, if necessary, for guiding pipe 4a The cleansing agent stream (R+r) introduced via the introduction point (E) in the upper rod guide passage area (A) from the valve surroundings branches at branching point (V) into partial streams ($R_1$, $R_2$) and into partial stream (R), whereby the last mentioned already takes the basic course depicted in FIG. 6, in this case to rod seal 5 and from there to the valve surroundings. A second flow guidance part 26 serves to separate and convey unthrottled partial streams ($R_1$ and $R_2$). A first and a second range spacer 26a or 26b provide for unequivocally specific passage cross sections and sufficiently defined current and pressure formation in the gaps on both sides of the second flow guide part. Partial stream $R_1$ arrives in ring slot 9 via connection bore 3c. Partial stream $R_2$ flows through a second connection bore 3f and the first supply bore 4e to bore 4d to clean the other rod guide passage (C) there.

The introduction and distribution system for the cleanser stream introduced from the valve surroundings depicted in FIGS. 6 and 7 is not dependent upon the manner in which this cleanser stream is further processed in the remaining course through the double seat valve. In the further course a number of modifications are possible. A operation of the areas relevant for cleaning technology purely in series is possible, as a purely parallel operation, or a mixed in series and parallel operation.

I claim:

1. Procedure for cleaning a double seat valve, in particular a substantially leakage free operating double seat valve, provided with two closing members(3, 4) acting in series and controllable using first and second operating rods (3a, 4b), containing a leakage hollow space (6) between them, whereby at least one closing member implements a partial stroke, which makes accessible a major part of a seat surface (2a) associated with a closing member to a cleanser stream, whereby the rod (3a) of the first closing member (3) is guided over a guide passage (A) between a first seal (5) and a pressure compensating piston (3b) out of an associated valve the second closing member (4) opening the guide passage (C) when the piston (4a) moves away from the second seal (7), so that the cleanser stream (R) is branched off in the first case from valve housing part (1a) to clean the guide passage (A) and in the second case from valve housing part (1b) to clean the guide passage (C);

in the closed position and in the partial open position given by respective partial stroke of the closing members (3, 4), a sealing of the first closing member (3) with its first seat seal (13) and of the second closing member (4) with its second seat seal (14) upon the seat surface (2a) is achieved; and the leakage hollow space (6) together with the seat surface (2a) made accessible by respective partial stroke of the closing members (3, 4) form the seat area (B).

2. Procedure according to claim 1, characterized by the cleanser stream (R) branched off from the valve housing part (1a, 1b) cleansing the guide passage (A, C) of the rod at the branching off point and, without any further successive branching, in any desired order, preferably from top to bottom, at least one of the following areas:

the seat surface (2a) which has been made accessible;

the leakage hollow space (6), and the guide passage (C, A).

3. Procedure according to claim 1, characterized by the cleanser stream (R) branching in connection with cleansing the rod guide passage (A , C) at the branching off point into partial streams $R_1$ which cleanse the relevant areas of the double seat valve, operating in one of parallel, and parallel and in series modes.

4. Procedure according to claim 3 characterized by branching of the cleanser stream (R) into two partial streams ($R_1$, $R_2$) of which one ($R_1$) cleanses the seal surface (2a) which has been made accessible, and the leakage hollow space (6), while the other ($R_2$) cleanses the other guide passage (C or A) , wherein:

the cleanser stream (R) branched off at one of the guide passage A by partial stroke of the first closing member (3) and the guide passage (C) by partial stroke of the second closing member (4) from the valve housingspart (1a) and (1b respectively divides into the first partial stream ($R_1$) and the second partial stream ($R_2$), with the first partial stream ($R_1$) cleansing the seat area (B) and the second partial stream ($R_2$) cleansing the respectively not opened guide passage (C, A); and when opening the guide passage (A), the second partial stream ($R_2$) will be drained off through a second outlet orifice (22), and when opening the guide passage (C), the second partial stream ($R_2$) will be drained off through a first outlet orifice (17).

5. Procedure according to claim 1 with two slide type closing members (3,4) characterized by the closing members (3,4) being displaced for opposite direction partial strokes ($T_{11}$, $T_{21}$), whereby the cleanser stream (R) branches off at the rod guide passage of that closing member, whose partial stroke runs counter to the valve opening movement (H).

6. Procedure according to claim 1 with two slide type closing members (3,4), of which one is driven independently of the other, the other being driven dependently, characterized by closing members (3,4) being displaced for same direction partial strokes ($T_{12}$, $T_{22}$), whereby the cleanser stream branches off at the rod guide passage of that closing member whose partial stroke runs against the opening movement (H) of the valve and is driven dependently.

7. Procedure according to claim 1 with one closing member constructed as a slide and one as a seat plate (3,4), whereby the slide type closing member is independently driven for the partial stroke, characterized by the slide type closing member being displaced for the partial stroke from the seat plate, which remains on its seat place.

8. Method for cleaning a double seat valve, especially one operating with substantially no leakage, equipped with two closing members (3,4) acting in series controllable by first and second operating rods (3a, 4b), which include a leakage hollow space (6) between them, whereby at least one closing member can execute a partial stroke which makes a major part of a seat area (2a) associated with the closing member accessible to a cleanser stream (R) introduced from its surroundings, whereby the rod (3a) of the first closing member (3) is guided via a guide passage (A) between a first seal (5) and a pressure compensating piston (3b) out of an associated valve housing part (1a) and the rod (4b) of the second closing member (4) is guided via a guide passage (C) between a second seal (7) and a piston (4a) out of an associated valve housing part (1b), characterized by the cleansing agent stream (R) being introduced via an introduction point (E) into the double seat valve, where it flows between the first seal.(5) and the pressure compensating piston (3b), down through the second operating rod (4b) and between the piston (4a) and the second seal (7) for cleaning between the seals and the positions so as to cleanse the guide passage (A, C) on the valve housing side of the introduction point (E) and at least one of the following areas:

the other guide passage (C, A), the leakage hollow space (6), and the seat surface (2a) which has been exposed and made accessible, wherein:

the first closing member (3) is connected with a first operating rod (3a) designed as a hollow rod connected to the pressure compensating piston (3b), at least one of the first operating rod (3a) and the pressure compensating piston (3b) being guided out of the associated valve housing part (1a) over a first seal (5) and being connected with a control arrangement (D), and together with the first seal (5) defining the guide passage (A);

the second closing member (4) is positioned below the first closing member (3) and is connected to the piston (4a), and being guided out of the associated valve housing part (1b) over a second seal (7) and connected with the control arrangement (D) by the second operating rod (4b) that is guided inside and through the first operating rod (3a), the position (4a) together with the second seal (7) defining the guide passage (C);

the first closing member (3) and its pressure compensating piston (3b) are movable relative to the second closing member (4) and its position (4a), with a partial stroke of the first closing member (3) opening the guide passage (A) when the piston (3b) moves away from the first seal (5), and a partial stroke of the second closing member (4) opening the guide passage (C) when the piston (4a) moves away from the second seal. (7), so that the cleanser stream (R) is branched off in the first case from valve housing part (1a) to clean the guide passage (A) and in the second case from valve housing part (1b) to clean the guide passage (C);

in the closed position and in the partial open position given by respective partial stroke of the closing members (3, 4), a sealing of the first closing member (3) with its first seat seal (13) and of the second closing member (4) with its second seat seal (14) upon the seat surface (2a) is achieved; and the leakage hollow space (6) together with the seat surface (2a) made accessible by respective partial stroke of the closing members (3, 4) form the seat area (B).

9. Procedure according to claim 8, characterized by branching the cleanser stream into partial streams ($R_1$) behind the introduction point (E) at the branching point (V), of which one partial stream (r) is throttled, the neighboring rod seal cleansed almost without pressure, and guided subsequently to the valve surroundings and at least one of the partial stream R and the partial streams ($R_1$, $R_2$) which is subjected to further processing instead of the cleanser stream obtained on the exposed guide passage (A, C).

10. Procedure according to claim 8 with two slide type closing members (3, 4), characterized by the closing members being displaced for a partial stroke.

11. Procedure according to claim 8 with one closing member (3, 4) of slide type, one as seat plate, whereby the slide type member is driven independently, characterized by the slide type closing member being displaced from the seat plate (which remains on its seat surface) for a partial stroke.

12. Valve arrangement comprising closing members (3, 4), enclosing between themselves a leakage hollow space (6), having first and second operating rods (3a, 4b) which lead to one side out of a valve housing (1a, 1b) and are connected with control arrangements (D), whereby the first closing member (3) facing the control arrangements is driven independently of the second closing member (4) through the first rod (3a) (which has a guide passage (A) in an associated valve housing part (1a), and the second closing member (4) is driven by the second rod (4b), characterized by the second closing member (4) being connected with the second rod (4b) by a piston (4a), by the piston (4a) enclosing the second rod (4b) coaxially and being conveyed by a guide passage (C) out of the other valve housing part (1b), and by the guide passage (A) having a connection to the leakage hollow space (6) via a ring slot (9) between the first rod (3a) and the second rod (4b) of the other closing member (guided in the first rod coaxially), and to guide passage (C) via the inside of the position (4a) and through openings (4h) in the piston (4a) wall, and by the guide passage (A) being exposed in a partial stroke directed against the opening movement (H) of the valve, thereby releasing the cleanser stream, wherein:

the first closing member (3) is connected with a first operating rod (3a) designed as a hollow rod connected to a pressure compensating piston (3b), at least one of the first operating rod (3a) and the pressure compensating piston (3b) being guided out of the associated valve housing part (1a) over a first seal (5) and being connected with a control arrangement (D), and together with the first seal (5) defining the guide passage (A);

the second closing member (4) is positioned below the first closing member (3) and is connected to the piston (4a), and being guided out of the associated valve housing part (1b) over a second seal (7) and connected with the control arrangement (D) over the second operating rod (4b) that is guided inside and through the first operating rod (3a), the piston (4a) together with the second seal (7) defining the guide passage (C);

the first closing member (3) and its pressure compensating piston (3b) are movable relative to the second closing member (4) and its piston (4a), with a partial stroke of the first closing member (3) opening the guide passage (A) when the piston (3b) moves away from the first seal (5), and a partial stroke of the second closing member (4) opening the guide passage (C) when the piston (4a) moves away from the second seal (7), so that the cleanser stream (R) is branched off in the first case from valve housing part (1a) to clean the guide passage (A) and in the second case from valve housing part (1b) to clean the guide passage (C);

in the closed position and in the partial open position given by respective partial stroke of the closing members (3, 4), a sealing of the first closing member (3) with its first seat seal (13) and of the second closing member (4) with its second seat seal (14) upon the seat surface (2a) is achieved; and the leakage hollow space (6) together with the seat surface (2a) made accessible by respective partial stroke of the closing members (3, 4) form the seat area (B).

13. Valve arrangement comprising closing members (3, 4) enclosing a leakage hollow space (6) between them and having first and second operating rods (3a, 4b) which are conveyed to one side out of a valve housing (1a, 1b) and connected with control arrangements (D), whereby the first closing member (3) (facing the control arrangements) is driven by the first rod (3a) which has a guide passage (A) in an associated valve housing part (1a), and the second closing member (4) is connected via a piston (4a) with the second rod (4b), which piston envelopes this rod coaxially, and which is guided out of the other valve housing part (1b) via a guide passsage (C); by the second rod (4b) being provided with a bore (4d) in an axial direction; by the connection path between the bore (4d) and the guide path (A) having a branching point (V) , from which a further connection runs to a ring slot (9) formed between the first rod (3a) and the second rod (4b) running coaxially in it; by the ring slot (9) having a connection to the leakage hollow space (6); and by the guide passage (A) being exposed in a partial stroke directed against the valve opening movement (H) of at least one of the first closing member (3) and the second closing member (4), exposing guide passage (C), thereby releasing the cleanser stream (R), which branches at the branching point (V) into partial streams ($R_1$, $R_2$), wherein:

the first closing member (3) is connected with a first operating rod (3a) designed as a hollow rod connected to a pressure compensating piston (3b), at least one of the first operating rod (3a) and the pressure compensating piston (3b) being guided out of the associated valve housing part (1a) over a first seal (5) and being connected with a control arrangement (D), and together with the first seal (5) defining the guide passage (A);

the second closing member (4) is positioned below the first closing member (3) and is connected to the piston (4a), and being guided out of the associated valve housing part (1b) over a second seal (7) and connected with the control arrangement (D) over the second operating rod (4b) that is guided inside and through the first operating rod (3a), the piston (4a) together with the second seal (7) defining the guide passage (C);

the first closing member (3) and its pressure compensating piston (3b) are movable relative to the second closing member (4) and its piston (4a), with a partial stroke of the first closing member (3) opening the guide passage (A) when the piston (3b) moves away from the first seal (5), and a partial stroke of the second closing member (4) opening the guide passage (C) when the piston (4a) moves away from the second seal (7) , so that the cleanser stream (R) is branched off in the first case from valve housing part (1a) to clean the guide passage (A) and in the second case from valve housing part (1b) to clean the guide passage (C);

in the closed position and in the partial open position given by respective partial stroke of the closing members (3, 4), a sealing of the first closing member (3) with its first seat seal (13) and of the second closing member (4) with its second seat seal (14) upon the seat surface (2a) is achieved; and the leakage hollow space (6) together with the seat surface (2a) made accessible by respective partial stroke of the closing members (3, 4) form the seat area (B).

14. Valve arrangement according to claim 13, characterized by the transmission path between the guide passage (A) and the branching point (V) having a first throttle gap (15) in one of the valve closing position and the valve position for the exposure of the guide passage (C), and by the transmission path between the guide path (C) and the bore (4d) having a second throttle gap (16) in one of the closed position of the valve and the valve position for the exposure of the guide passage (A), respectively.

15. Valve arrangement according to claim 13, characterized by the piston (4a) widening in diameter to approach the diameter of the valve seat in the entire area of its extension between the closing member (4) and its guide passage (c).

16. Valve arrangement according to claim 13, characterized by the first rod (3a) widening in diameter to the seat diameter of the valve in the form of a pressure compensation piston (3b) in the region of its guide passage (A) through the valve housing part (1a).

17. Valve arrangement according to claim 13, characterized by an outlet orifice (17 or 22) for discharge of the partial stream ($R_2$) of the cleanser stream in the area above the first seal (5) or below the second seal (7) being opened or closed by remote control.

18. Valve arrangement according to claim 13, characterized by the release of guide passages (A, C) occurring through at least one of a group of first recesses (3e) in at least one of the first rod (3a) and in the pressure compensation piston (3b), and a group of second recesses (4g) in the piston (4a), whereby each group presents depressions separated from one another, oriented along a line at an acute angle to the valve axis, distributed over the extent of at least one of the rod (3a), the pressure compensation piston (3b) and the position (4a).

19. Valve arrangement according to claim 13, with two slide type closing members (3, 4) which can impart partial strokes, whereby their respective sealing is retained in the seat area, characterized by the fact that in the same valve arrangement, same or opposite direction partial strokes ($T_{11}$, $T_{21}$ or $T_{12}$, $T_{22}$) can be executed within an associated seat surface (2a), whereby the partial stroke ($T_{11}$) of the first closing member (3) is provided for the exposure of the guide passage (A) of the first rod (3a) in the valve housing part (1a), the partial stroke ($T_{22}$) of the second closing member (4), which approaches the same magnitude and is like oriented, is provided for the alternative exposure of guide passage (C) of the piston (4a) in the valve housing part (1b); and by the fact that, in same direction partial strokes, the partial stroke ($T_2$) of the first closing member (3) (possibly loaded with product) is so proportioned that the guide passage (A) remains closed.

20. Valve arrangement according to claim 19, characterized by the closing members (3, 4), in relation to their equilibrium in the closed position of the valve arrangement being so arranged in axial displacement in the direction of the second closing member (4) within the seat surface (2a) that same direction partial strokes ($T_{11}$, $T_{21}$, whereby $T_{11} > T_{21}$) can be implemented with a slight clearance (b1, b2) from the respective end of the seat surface (2a).

21. Valve arrangement according to claim 13 characterized by the provision of an insert (24) of like construction between the housing and at least one of the pressure compensation piston (3b) and the piston (4a) in the region of the guide passage (A and C), which for one forms a throttle gap (15, 16) with the respective one of the pressure compensation piston (3b) and with the piston (4a), and secondly contains a drain hole (24a) for discharge of the partial stream (r) from a chamber adjacent to the seal (5, 7) and partially formed by the insert (24) into the valve surroundings.

22. Procedure according to claim 1, characterized by the sealing on the seat surface (2a) being retained.

23. Procedure according to claim 8, characterized by the sealing on the seat surface (2a) being retained.

* * * * *

UNITED STATES PATENT AND TRADEMARK OFFICE
CERTIFICATE OF CORRECTION

PATENT NO. : 5,575,305
DATED : Nov. 19, 1996
INVENTOR(S) : Hans O. Mieth

It is certified that error appears in the above-indentified patent and that said Letters Patent is hereby corrected as shown below:

Column 13, line 46, after "valve", insert the following:

-- housing part (1a) and the rod (4b) of the second closing member (4) over a guide passage (C) between a second seal (7) and a piston (4a) out of an associated housing part, characterized by the guide passage (A, C) being exposed in such a way that the cleanser stream (R) flows between the first seal (5) and the pressure compensating piston (3b), down through the second operating rod (4b) and between the piston (4a) and the second seal (7) for cleaning between the seals and the pistons so as to cleanse the guide passage (A, C) and at least one of the following areas:

- the other guide passage (C, A),
- the leakage hollow space (6), and
- the seat surface which has been made accessible (2a), wherein:

the first closing member (3) is connected with a first operating rod (3a) designed as a hollow rod connected to the pressure compensating piston (3b), at least one of the first operating rod (3a) and the pressure compensating piston (3b)

UNITED STATES PATENT AND TRADEMARK OFFICE
CERTIFICATE OF CORRECTION

PATENT NO. : 5,575,305  
DATED : Nov. 19, 1996  
INVENTOR(S) : Hans O. Mieth

Page 2 of 3

It is certified that error appears in the above-indentified patent and that said Letters Patent is hereby corrected as shown below:

being guided out of the associated valve housing part (1a) over the first seal (5) and being connected with a control arrangement (D), and together with the first seal (5) defining the guide passage (A);

the second closing member (4) is positioned below the first closing member (3) and is connected to the piston (4a), and being guided out of the associated valve housing part (1b) over the second seal (7) and connected with the control arrangement (D) by the second operating rod (4b) that is guided inside and through the first operating rod (3a) the piston (4a) together with the second seal (7) defining the guide passage (C);

the first closing member (3) and its pressure compensating piston (3b) are movable relative to the second closing member (4) and its piston (4a), with a partial stroke of the first closing member (3) opening the guide passage (A) when the piston (3b) moves away from the first seal (5), and a partial stroke of --

UNITED STATES PATENT AND TRADEMARK OFFICE
CERTIFICATE OF CORRECTION

PATENT NO. : 5,575,305
DATED : Nov. 19, 1996
INVENTOR(S) : Hans O. Mieth

It is certified that error appears in the above-indentified patent and that said Letters Patent is hereby corrected as shown below:

Column 15, line 26 "position", should be -- piston --;
             line 30 "position", should be -- piston --.
Column 16, line 17 "position", should be -- piston --.
Column 18, line 23 "position", should be -- piston --;
             line 39 "$(T_2)$", should be -- $(T_{12})$ --.

Signed and Sealed this

Eleventh Day of February, 1997

Attest:

BRUCE LEHMAN

*Attesting Officer*  *Commissioner of Patents and Trademarks*